US010695909B2

(12) United States Patent
Yamamoto et al.

(10) Patent No.: US 10,695,909 B2
(45) Date of Patent: *Jun. 30, 2020

(54) ROBOT SYSTEM AND ROBOT CONTROL METHOD

(71) Applicant: FANUC CORPORATION, Yamanashi (JP)

(72) Inventors: Tomoyuki Yamamoto, Yamanashi (JP); Nao Ooshima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 240 days.

This patent is subject to a terminal disclaimer.

(21) Appl. No.: 15/913,981

(22) Filed: Mar. 7, 2018

(65) Prior Publication Data

US 2018/0257232 A1    Sep. 13, 2018

(30) Foreign Application Priority Data

Mar. 13, 2017   (JP) ................... 2017-047454

(51) Int. Cl.
*B25J 9/16* (2006.01)
*B25J 9/10* (2006.01)
*B25J 19/06* (2006.01)

(52) U.S. Cl.
CPC ............ *B25J 9/1676* (2013.01); *B25J 9/10* (2013.01); *B25J 9/1666* (2013.01); *B25J 19/06* (2013.01); *G05B 2219/49137* (2013.01)

(58) Field of Classification Search
CPC . B25J 9/1676; B25J 9/10; B25J 9/1666; B25J 19/06; G05B 2219/49137
See application file for complete search history.

(56) References Cited

U.S. PATENT DOCUMENTS

| 8,315,735 | B2* | 11/2012 | Nihei | B25J 9/1676 |
| | | | | 700/245 |
| 10,286,551 | B2* | 5/2019 | Inaba | B25J 9/163 |

(Continued)

FOREIGN PATENT DOCUMENTS

| CN | 101402202 A | 4/2009 |
| CN | 101888920 A | 11/2010 |

(Continued)

OTHER PUBLICATIONS

Office Action dated Nov. 20, 2018 in corresponding Japanese Application No. 2017-047454; 7 pages including English-language translation.

(Continued)

*Primary Examiner* — Nicholas Kiswanto
(74) *Attorney, Agent, or Firm* — Maier & Maier, PLLC (57) ABSTRACT

A robot system including: a robot and a controller, the controller is configured to conduct: a region generating process that generates a robot inclusion region which includes the robot and the like and whose area increases as a speed of the robot increases, an entry prohibited region near the robot, and a speed limit region along the robot side edge of the entry prohibited region; an entry detecting process that detects whether or not the generated robot inclusion region enters the entry prohibited region or the speed limit region; a speed limiting process that reduces operating speed of the robot if the robot inclusion region enters the speed limit region; and a power cutoff unit that immediately stops the robot if the robot inclusion region enters the entry prohibited region.

8 Claims, 8 Drawing Sheets

(56) References Cited

U.S. PATENT DOCUMENTS

| | | | |
|---|---|---|---|
| 10,406,689 B2* | 9/2019 | Takeda | B25J 9/1671 |
| 2004/0249508 A1* | 12/2004 | Suita | B25J 9/1666 |
| | | | 700/245 |
| 2006/0052901 A1 | 3/2006 | Nihei et al. | |
| 2009/0091286 A1 | 4/2009 | Nihei et al. | |
| 2010/0292843 A1 | 11/2010 | Kariyazaki et al. | |
| 2011/0060462 A1* | 3/2011 | Aurnhammer | B25J 9/1674 |
| | | | 700/255 |
| 2011/0224826 A1 | 9/2011 | Maehara et al. | |
| 2016/0236347 A1* | 8/2016 | Shikina | B25J 9/1676 |
| 2018/0333869 A1* | 11/2018 | Ding | B25J 5/00 |
| 2019/0125485 A1* | 5/2019 | Usui | A61B 90/50 |

FOREIGN PATENT DOCUMENTS

| | | |
|---|---|---|
| EP | 1632318 A2 | 3/2006 |
| EP | 2 047 955 A2 | 4/2009 |
| EP | 2 230 054 A1 | 9/2010 |
| EP | 2366504 A2 | 9/2011 |
| JP | 2004-243427 A | 9/2004 |
| JP | 2006-043861 A | 2/2006 |
| JP | 2006-068857 A | 3/2006 |
| JP | 2009-093352 A | 4/2009 |
| JP | 2009-178842 A | 8/2009 |
| JP | 2010-52114 A | 3/2010 |
| JP | 2010-208002 A | 9/2010 |
| JP | 2011-212831 A | 10/2011 |
| JP | 2012-056026 A | 3/2012 |
| JP | 2014-6577 A | 1/2014 |
| JP | 2015-000470 A | 1/2015 |

OTHER PUBLICATIONS

Search Report dated Nov. 8, 2018 in corresponding Japanese Application No. 2017-047454; 37 pages including English-language translation.

* cited by examiner

ROBOT SYSTEM AND ROBOT CONTROL METHOD

CROSS-REFERENCE TO RELATED APPLICATIONS

This application is based on and claims priority to Japanese Patent Application No. 2017-047454 filed on Mar. 13, 2017, the entire content of which is incorporated herein by reference.

FIELD

The present invention relates to a robot system and a robot control method.

BACKGROUND

Conventionally, there is known a robot system in which an arm-occupied region including a robot arm and a work and tool attached to a robot wrist is defined around the robot, and a predicted coasting position of the robot in a case where the robot is emergently stopped is estimated, and the robot is immediately stopped if the arm-occupied region at the predicted coasting position comes into contact with a virtual safety protection barrier (for example, see PLT 1).

SUMMARY

To achieve the above described object, the present invention provides the following means.

An aspect of the present invention provides a robot system including a robot and a controller that controls the robot, wherein the controller is configured to conduct: a region generating process that generates a robot inclusion region which includes the robot and an attached member attached to the robot and whose area increases as speed of the robot increases, an entry prohibited region near the robot, and a speed limit region along a robot side edge of the entry prohibited region; an entry detecting process that detects whether or not the robot inclusion region generated by the region generating process enters the entry prohibited region or the speed limit region; a speed limiting process that reduces operating speed of the robot if the entry detecting process detects that the robot inclusion region enters the speed limit region; and a power cutoff process that immediately stops the robot if the entry detecting process detects that the robot inclusion region enters the entry prohibited region.

Another aspect of the present invention provides a robot system including a robot and a controller that controls the robot, wherein the controller is configured to conduct: a region generating process that generates a robot inclusion region which includes the robot and an attached member attached to the robot, and an entry prohibited region near the robot; a future position and speed estimating process that estimates an estimated future speed and an estimated future position based on a current position and speed of the robot when a predetermined time has elapsed; an entry detecting process that detects whether or not the robot inclusion region generated by the region generating process enters the entry prohibited region; a power cutoff process that immediately stops the robot if the entry detecting process detects that the robot inclusion region at the current position of the robot enters the entry prohibited region; and a speed limiting process that reduces operating speed of the robot if the entry detecting process detects that the robot inclusion region at the estimated future position of the robot enters the entry prohibited region, wherein in the region generating process, the controller is configured to conduct: a stop position estimating process that estimates an estimated stop position in a case where a robot stop command is input based on a position and a speed of the robot; and an inclusion region adjusting process that adjusts a size of the robot inclusion region so that the robot inclusion region includes the estimated stop position estimated by the stop position estimating process.

Another aspect of the present invention provides a robot control method including: a region generating step of generating a robot inclusion region which includes a robot and an attached member attached to the robot and whose area increases as a speed of the robot increases, an entry prohibited region near the robot, and a speed limit region along a robot side region of the entry prohibited region; an entry detecting step of detecting whether or not the robot inclusion region generated by the region generating step enters the entry prohibited region or the speed limit region; a speed limiting step of reducing operating speed of the robot if the entry detecting step detects that the robot inclusion region enters the speed limit region; and a power cutoff step of immediately stopping the robot if the entry detecting step detects that the robot inclusion region enters the entry prohibited region.

Another aspect of the present invention provides a robot control method including: a region generating step of generating a robot inclusion region which includes the robot and an attached member attached to the robot, and an entry prohibited region near the robot; a future position and speed estimating step of estimating an estimated future speed and an estimated future position when a predetermined time has elapsed on a basis of a current position and speed of the robot; an entry detecting step of detecting whether or not the robot inclusion region generated by the region generating step enters the entry prohibited region; a power cutoff step of immediately stopping the robot if the entry detecting step detects that the robot inclusion region at the current position of the robot enters the entry prohibited region; and a speed limiting step of reducing an operating speed of the robot if the entry detecting step detects that the robot inclusion region at the estimated future position of the robot enters the entry prohibited region, wherein the region generating step includes: a stop position estimating step of estimating an estimated stop position in a case where a robot stop command is input, on a basis of a position and a speed of the robot; and an inclusion region adjusting step of adjusting a size of the robot inclusion region so that the robot inclusion region includes the estimated stop position estimated by the stop position estimating step.

DETAILED DESCRIPTION

A robot system 1 according to an embodiment of the present invention will be described with reference to drawings.

Figure 1:
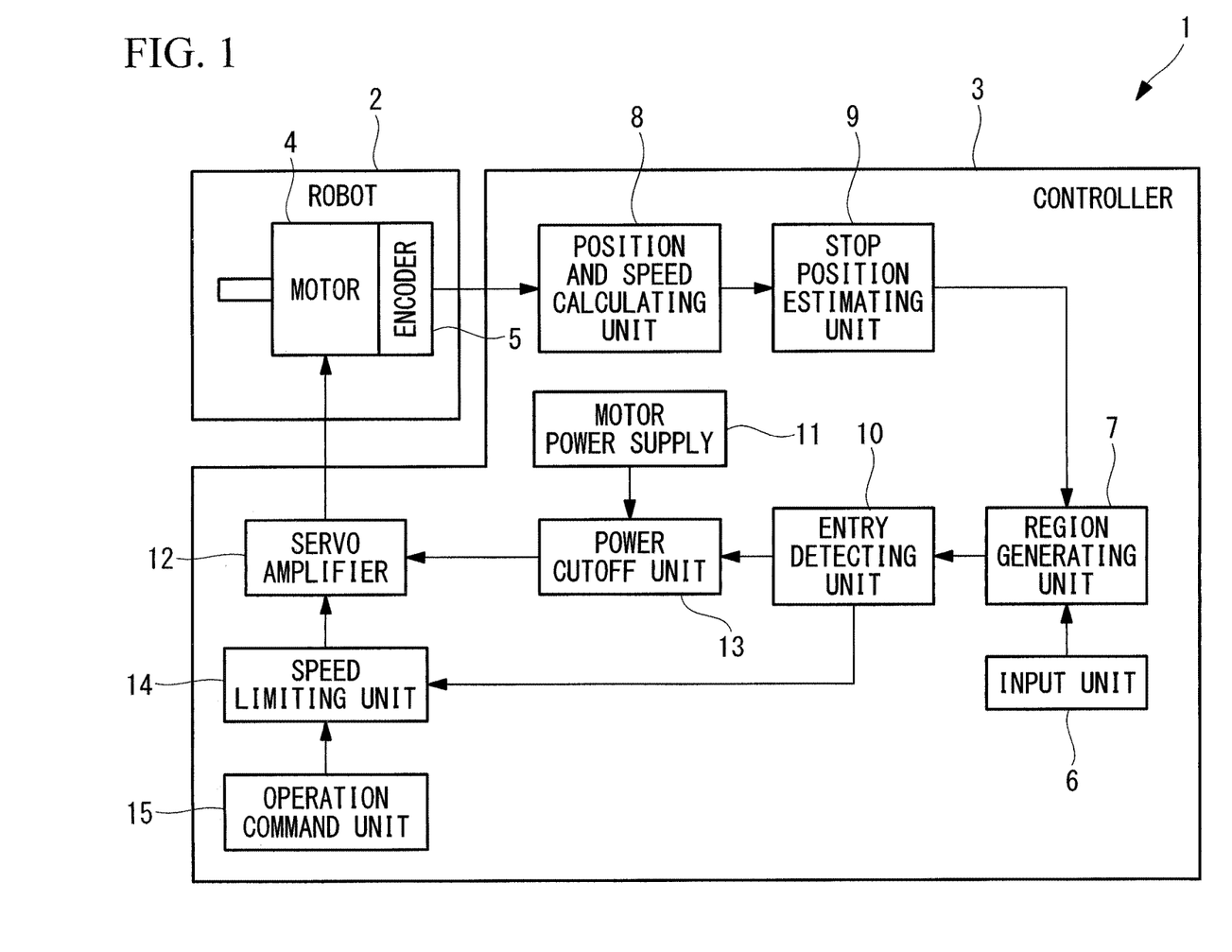
FIG. 1 is a block diagram illustrating a robot system according to a first embodiment of the present invention.

As shown in FIG. 1, the robot system 1 according to the present embodiment includes a robot 2 and a controller that controls the robot 2.

The robot 2 includes at least one link and a motor 4 that drives the link, and each motor 4 is provided with an encoder 5 that detects a rotation angle position.

A controller 3 includes an input unit 6 through which a user makes inputs, and a region generating unit (region generating unit, inclusion region adjusting unit) 7 which generates a region on the basis of inputs to the input unit 6.

Figure 2:
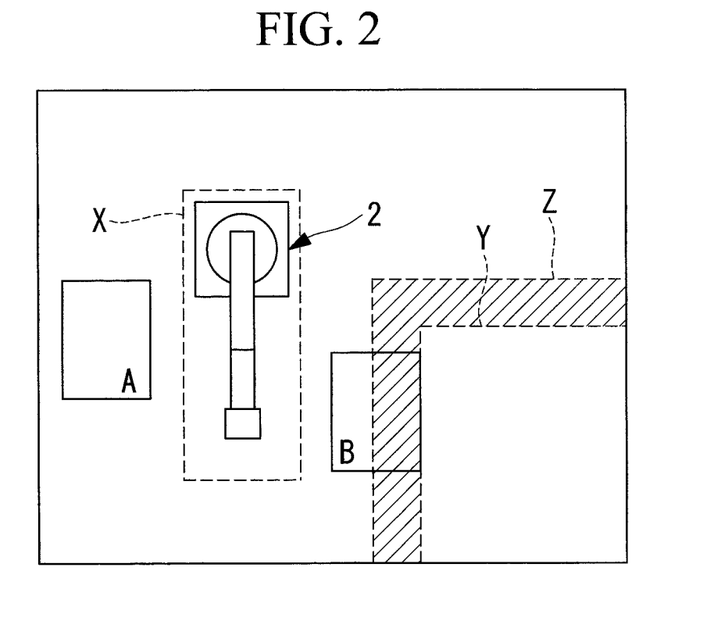
FIG. 2 is a plan view illustrating the robot system of FIG. 1.

As shown in FIG. 2, the region generating unit 7 is adapted to generate a robot inclusion region X that includes the robot 2 and an attached member such as a hand or a work attached to the robot 2, an entry prohibited region Y that is near the robot 2 and in which the robot 2 cannot enter, and a speed limit region Z along the robot 2 side edge of the entry prohibited region Y.

The robot inclusion region X is formed of, for example, a three-dimensional model using a simple shape such as a rectangular parallelepiped, a cylinder or a sphere, as shown in FIG. 2, or a three-dimensional model of a combination thereof. In FIG. 2, a rectangular parallelepiped is illustrated as a three-dimensional model. By selecting a three-dimensional model to be used by a user and specifying the coordinates on the robot 2 to which the three-dimensional model is fixed, the robot inclusion region X which includes the robot 2 and its attached member and operates together with the robot 2 can be easily generated.

In addition, the size of the robot inclusion region X composed of the selected three-dimensional model varies in accordance with the operating speed of the robot 2. As the operating speed of the robot 2 is higher, the robot inclusion region X is generated to be larger, and as the operating speed of the robot 2 is lower, the robot inclusion region X is generated to be smaller.

The entry prohibited region Y is a region in which the robot 2 should be prohibited from entering, such as a region where a worker performs work or a region where a peripheral devices are arranged. The entry prohibited region Y can be generated by setting coordinates by the user.

For example, as indicated by hatching in FIG. 2, when the entry prohibited region Y is generated, the speed limit region Z is automatically provided over a predetermined thickness from the entry prohibited region Y to the robot 2 side.

The controller 3 includes a position and speed calculating unit 8 that calculates the current position, speed, and moving direction of the robot 2 on the basis of the rotation angle position detected by the encoder 5, and a stop position estimating unit (region generating unit) 9 that calculates an estimated stop position in a case where a robot stop command is input, on the basis of the speed and moving direction at the current position of the robot 2 calculated by the position and speed calculating unit 8. Since the estimated stop position varies according to the coasting distance of the robot 2, the estimated stop position is calculated to be a position more distant from the current position as the operating speed of the robot 2 is higher.

The region generating unit 7 is adapted to generate the robot inclusion region X to include the estimated stop position calculated by the stop position estimating unit 9. As described above, since the distance from the current position to the estimated stop position becomes longer as the operating speed of the robot 2 becomes higher, the robot inclusion region X is adjusted and generated to be larger as the operating speed of the robot 2 is higher.

Further, the controller 3 includes an entry detecting unit 10 that detects whether or not the robot inclusion region X generated by the region generating unit 7 enters the entry prohibited region Y or the speed limit region Z, a power cutoff unit 13 that cuts off the supply of power from a motor power supply 11 to a servo amplifier 12 if the entry detecting unit 10 detects that the robot inclusion region X enters the entry prohibited region Y, and a speed limiting unit 14 that reduces the operating speed of the robot 2 if the entry detecting unit 10 detects that the robot inclusion region X enters the speed limit region Z.

In the figures, reference numeral 15 denotes an operation command unit that is provided in the controller 3 and that outputs an operation command signal that drives a motor 4 of each axis of the robot 2 according to an instructed operation program.

A robot control method in the robot system 1 according to the present embodiment configured as described above will be described below.

Figure 5:
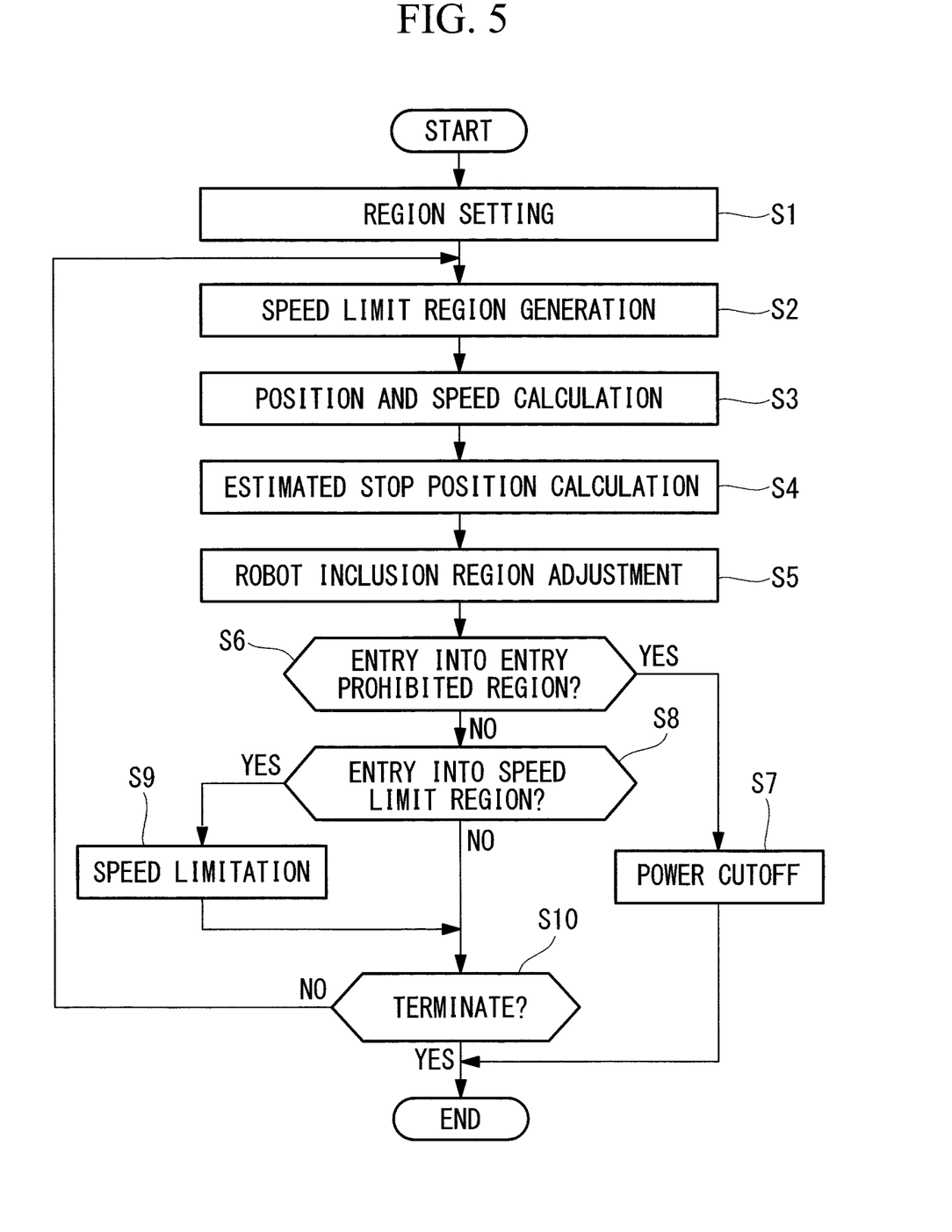
FIG. 5 is a flowchart illustrating a robot control method by the robot system of FIG. 1.

As shown in FIG. 5, the robot control method according to the present embodiment includes a region setting step (region generating step) S1 of setting a robot inclusion region X and an entry prohibited region Y by the region generating unit 7, and a region generating step (region generating step) S2 of generating a speed limit region Z on the basis of the set entry prohibited region Y.

The robot control method according to the present embodiment further includes a step S3 of calculating the position and the speed of the robot 2 by the position and speed calculating unit 8 from the rotation angle position of the motor 4 detected by the encoder 5, and a stop position estimating step (region generating step) S4 of calculating an estimated stop position by the stop position estimating unit 9 on the basis of the calculated position and speed.

The robot control method according to the present embodiment further includes an inclusion region adjusting step (region generating step) S5 of adjusting the size of the robot inclusion region X on the basis of the estimated stop position estimated by the stop position estimating unit 9, a first entry detecting step (entry detecting step) S6 of detecting whether or not the adjusted robot inclusion region X enters the entry prohibited region Y, and a power cutoff step S7 of cutting off the supply of power to the servo amplifier 12 by the power cutoff unit 13 when entry into the entry prohibited region Y is detected.

The robot control method according to the present embodiment further includes a second entry detecting step (entry detecting step) S8 of detecting whether or not the robot inclusion region X enters the speed limit region Z in a case where there is no entry detected into the entry prohibited region Y in the first entry detecting step S6, and a speed limiting step S9 of reducing the operating speed of the robot 2 by the speed limiting unit 14 when entry into the speed limit region Z is detected. Then, if speed limiting has been performed or if there is no entry into the speed limit region Z, whether or not to terminate the process (step S10) is confirmed, and if not, the process is repeated from step S2.

Figure 4:
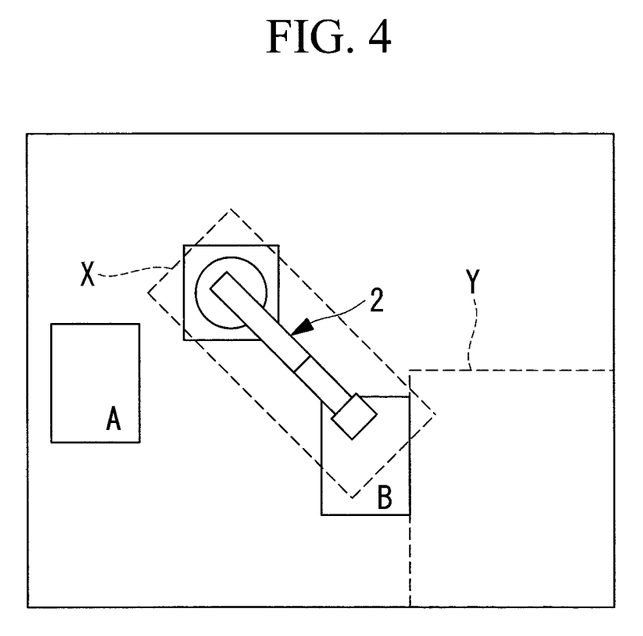
FIG. 4 is a plan view illustrating a reference example of a robot system in a case where a speed limit region is not generated.

For example, in the example shown in FIG. 2, in a case where the robot 2 transfers a work from a point A to a point B, the operating speed of the robot 2 becomes high between the point A and the point B, and therefore the estimated stop position estimated by the stop position estimating unit 9 becomes distant from the current position, and the robot inclusion region X is generated to be relatively larger. In this case, as shown in FIG. 4, if the robot 2 moves to the vicinity of the point B with the high operating speed while the speed limit region Z has not been generated, the robot inclusion region X enters the entry prohibited region Y, and the robot 2 is emergently stopped.

Figure 3:
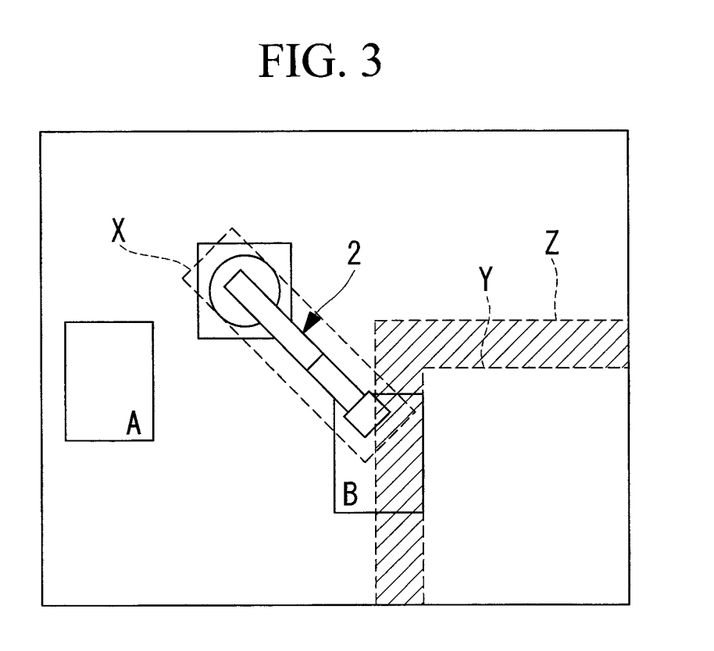
FIG. 3 is a plan view illustrating a state in which a robot inclusion region has entered a speed limit region in the robot system of FIG. 2.

In contrast, according to the robot system 1 and the robot control method of the present embodiment, the robot inclusion region X enters the speed limit region Z generated so as to cover the entry prohibited region Y before reaching the point B from the point A, and thereby the operating speed of the robot 2 is reduced. As a result, as shown in FIG. 3, since the robot inclusion region X becomes smaller as the operating speed is reduced, the robot inclusion region X does not enter the entry prohibited region Y even if it moves to the same position as in FIG. 4, and emergency stop of the robot 2 can be avoided.

As described above, according to the robot system 1 and the robot control method of the present embodiment, there is an advantage that frequent emergency stop of the robot 2 can be avoided, and the work efficiency of the robot 2 can be improved. In this case, setting the operating speed of the robot 2 by an instruction of an operation program or the like is not required for preventing the robot 2 from entering the entry prohibited region Y, and there is an advantage that the instruction program can be prevented from being complicated, and instruction operation can be facilitated.

Further, there is an advantage that the robot 2 is can be moved closer to the entry prohibited region Y, and workability can be improved by expanding the operation range.

Next, a robot system 16 according to a second embodiment of the present invention will be described below with reference to drawings.

In description of the present embodiment, the same reference signs are given to elements having a common configuration to the robot system 1 according to the above described first embodiment, and description thereof will be omitted.

Figure 6:
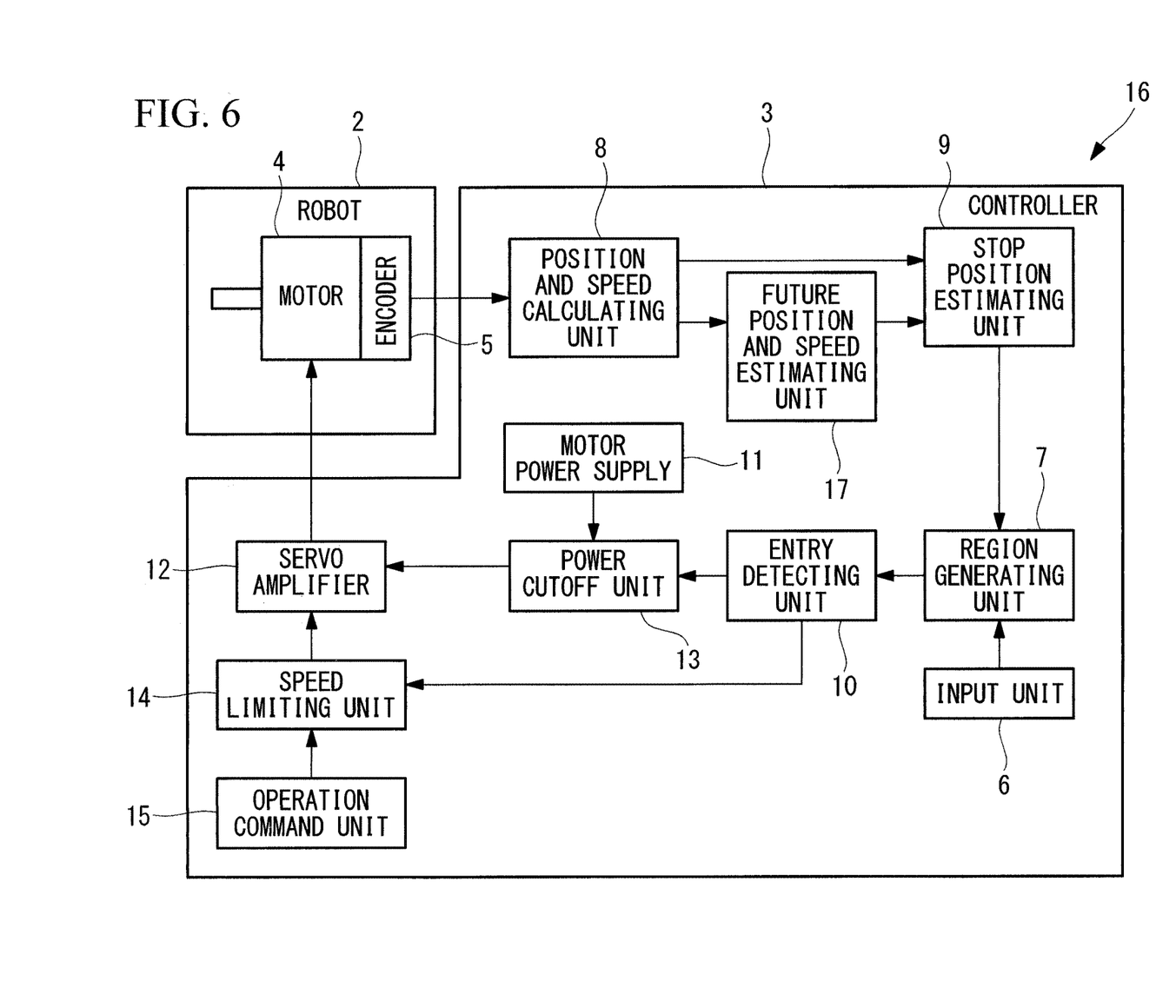
FIG. 6 is a block diagram illustrating a robot system according to a second embodiment of the present invention.

As shown in FIG. 6, the robot system 16 according to the present embodiment includes a future position and speed estimating unit 17 that estimates a future speed and a future position after a predetermined time on the basis of the current position and speed of the robot 2 calculated by a position and speed calculating unit 8.

Figure 7:
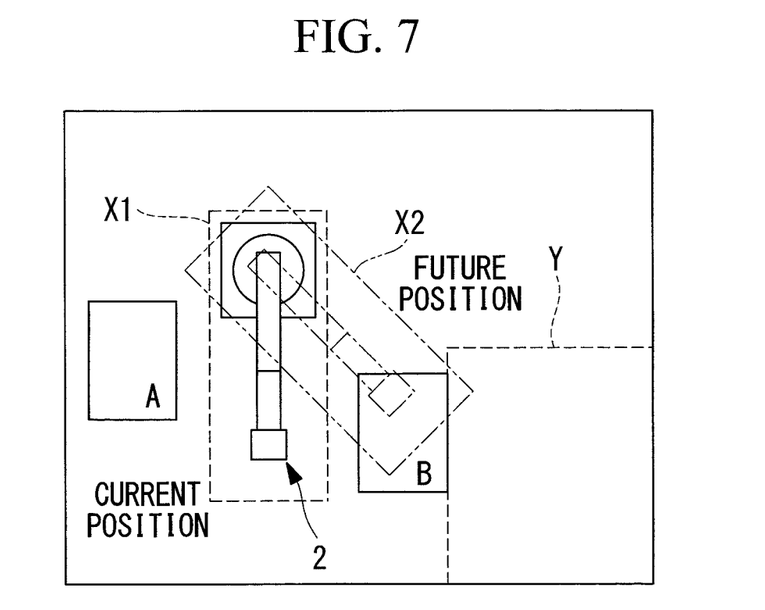
FIG. 7 is a plan view illustrating a state in which a robot inclusion region at a future position has entered in an entry prohibited region in the robot system of FIG. 6.
Figure 8:
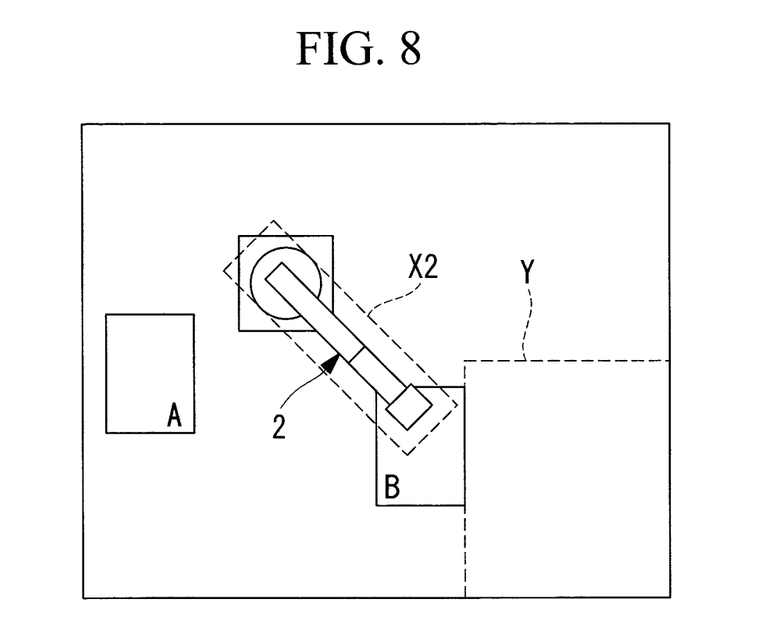
FIG. 8 is a plan view illustrating a state after a speed limitation in the robot system of FIG. 7.

Then, a stop position estimating unit 9 is adapted to calculate an estimated stop position for each of the current position and the future position of the robot 2 as shown in FIG. 7.

In the present embodiment, a region generating unit 7 is adapted to generate an entry prohibited region Y and robot inclusion regions X1, X2. The robot inclusion regions X1, X2 are generated on the basis of the estimated stop positions at the current position and the future position of the robot 2 calculated by the stop position estimating unit 9, respectively.

Then, an entry detecting unit 10 is adapted to detect whether or not the robot inclusion region X1 of the current position generated by the region generating unit 7 enters the entry prohibited region Y, and whether or not the robot inclusion region X2 of the future position generated by the region generating unit 7 enters the entry prohibited region Y.

As in the first embodiment, if the entry detecting unit 10 detects that the robot inclusion region X1 of the current position enters the entry prohibited region Y, a power cutoff unit 13 cuts off power from a motor power supply 11.

In the present embodiment, if the entry detecting unit 10 detects that the robot inclusion region X2 of the future position enters the entry prohibited region Y, a speed limiting unit 14 reduces the operating speed of the robot 2.

A robot control method in the robot system 16 according to the present embodiment configured as described above will be described below.

Figure 9:
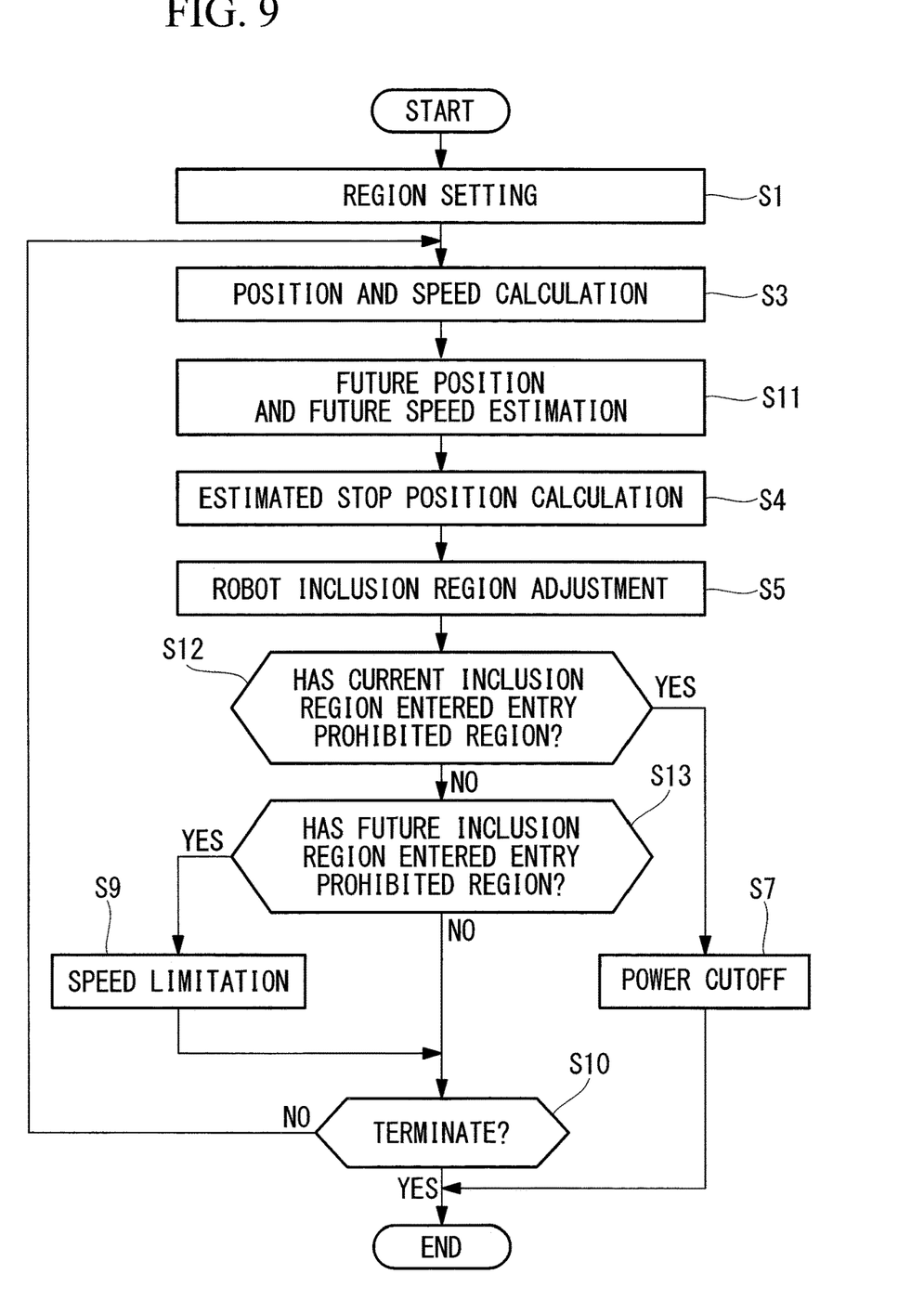
FIG. 9 is a flowchart illustrating a robot control method by the robot system of FIG. 6.

As shown in FIG. 9, the robot control method according to the present embodiment does not include the region generating step S2 of generating the speed limit region Z of the first embodiment, but instead includes a future position and speed estimating step S11 of calculating a future position and future speed.

Further, instead of the first entry detecting step S6 of constantly detecting whether or not the robot inclusion region X1 of the current position enters the entry prohibited region Y and the second step S8 of detecting whether or not the robot inclusion region X1 enters the speed limit region Z, the robot control method includes a third entry detecting step (entry detecting step) S12 of detecting whether or not the robot inclusion region X1 of the current position enters the entry prohibited region Y, and a fourth entry detecting step (entry detecting step) S13 of detecting whether or not the robot inclusion region X2 of the future position enters the entry prohibited region Y.

According to the robot system 16 and the robot control method of the present embodiment configured as described above, at each current position during operation of the robot 2, a future position after a predetermined time is calculated. And, if it is detected that the robot inclusion region X2 at the future position enters the entry prohibited region Y, the operating speed of the robot 2 in the future position is reduced. Accordingly, as shown in FIG. 9, there is an advantage that the robot inclusion region X2 at the future position is can be made smaller compared to the case where the operating speed of the robot 2 in the future position is not reduced, and therefore entry into the entry prohibited region Y can be avoided, and the work efficiency of the robot 2 can be improved.

Also in this case, setting the operating speed of the robot 2 by an instruction of an operation program or the like is not required so that the robot 2 does not enter the entry prohibited region Y, and there is an advantage that the instruction program can be prevented from being complicated, and instruction operation can be facilitated.

Further, there is an advantage that the robot 2 can be moved closer to the entry prohibited region Y, and workability can be improved by expanding the operation range.

Figure 10:
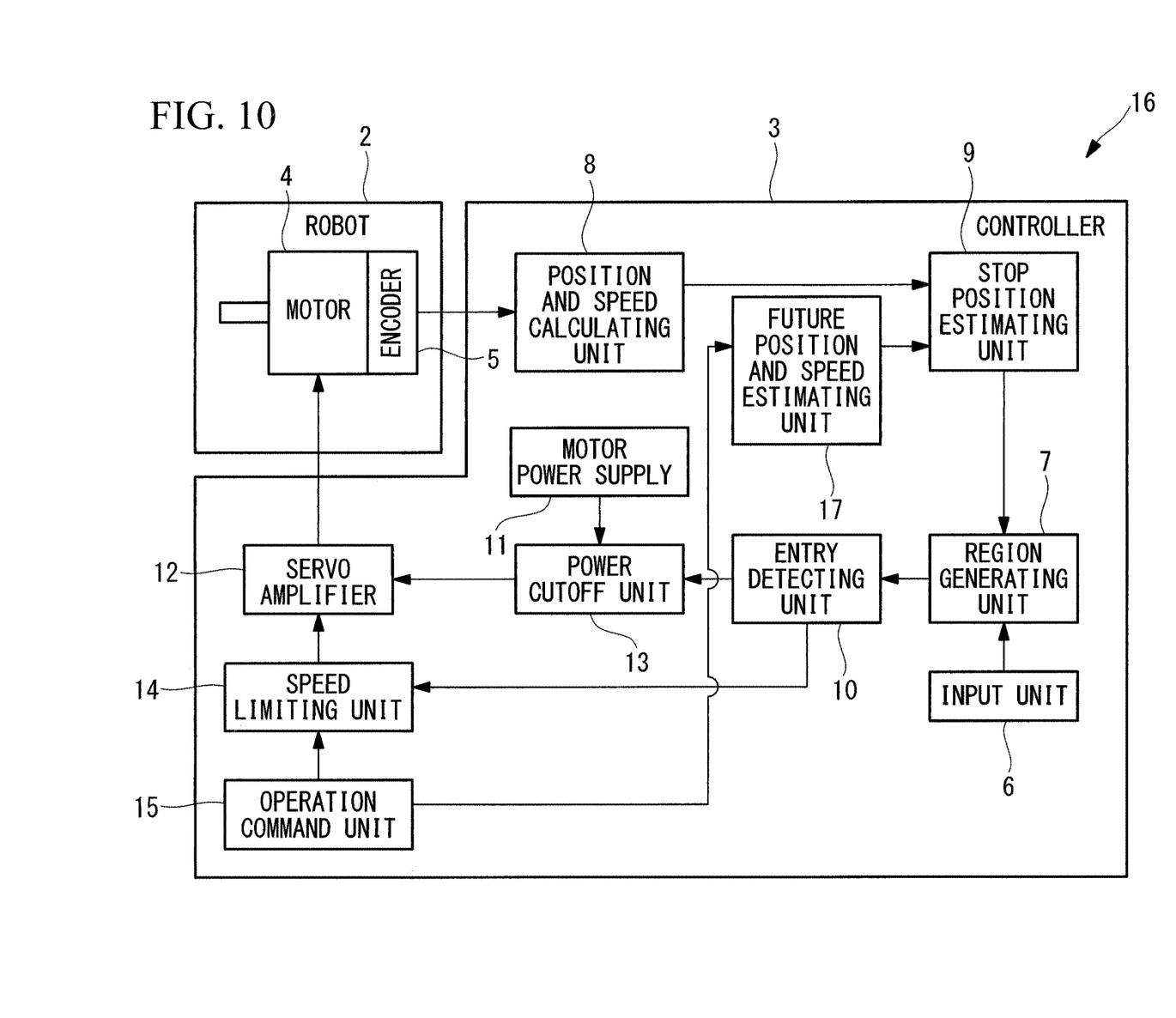
FIG. 10 is a block diagram illustrating a modification of the robot system of FIG. 6.

In the present embodiment, a future position and a future speed after a predetermined time are estimated on the basis of the rotation angle position of the motor 4 detected by the encoder 5, but instead they may be estimated from information of an operation program which is output from an operation command unit 15 as shown in FIG. 10.

Although the speed limiting unit 14 has been described as simply reducing speed in the above described embodiments, as a manner of reducing the speed, the speed may be reduced by a preset ratio (for example, 50% or the like), or an upper limit speed at which the robot inclusion region X2 at a future position does not enter the entry prohibited region Y may be calculated, and the speed may be reduced to the upper limit speed.

In the case of reducing the speed at a predetermined ratio, there is an advantage that processing is simple, and in the case of reducing the speed to the upper limit speed, there is an advantage that the work efficiency can be improved by securing the maximum operating speed of the robot 2.

The inventors have arrived at the following aspects of the present invention.

An aspect of the present invention provides a robot system including a robot and a controller that controls the robot, the controller including: a region generating unit that generates a robot inclusion region which includes the robot and an attached member attached to the robot and whose area increases as speed of the robot increases, an entry prohibited region near the robot, and a speed limit region along a robot side edge of the entry prohibited region; an entry detecting unit that detects whether or not the robot inclusion region generated by the region generating unit enters the entry prohibited region or the speed limit region; a speed limiting unit that reduces operating speed of the robot if the entry detecting unit detects that the robot inclusion region enters the speed limit region; and a power cutoff unit that immediately stops the robot if the entry detecting unit detects that the robot inclusion region enters the entry prohibited region.

According to this aspect, the region generating unit included in the controller generates the robot inclusion region which includes the robot and its attached members, the entry prohibited region near the robot, and the speed limit region along the robot side region of the entry prohibited region. Then, during operation of the robot by the controller, whether or not the robot inclusion region enters the entry prohibited region or the speed limit region is monitored by the entry detecting unit.

If the entry detecting unit detects that the robot inclusion region enters the entry prohibited region, the robot is immediately stopped by operation of the power cutoff unit. Because a larger robot inclusion region is generated as the operating speed of the robot increases, entry into the entry prohibited region can be detected at an early stage. Further, if the entry detecting unit detects that the robot inclusion region enters the speed limit region, the operating speed of the robot is reduced by the speed limiting unit. Thereby, the robot inclusion region generated by the region generating unit is reduced, so that entry into the entry prohibited region is avoided. Accordingly, it is possible to efficiently operate the robot while reducing the frequency of stopping the robot while securing a wide operating range of the robot without complicating a program.

In the above described aspect, the region generating unit may include: a stop position estimating unit that estimates an estimated stop position based on a position and a speed of the robot in a case where a robot stop command is input; and an inclusion region adjusting unit that adjusts a size of the robot inclusion region so that the robot inclusion region includes the estimated stop position estimated by the stop position estimating unit.

In this way, as the speed of the robot increases, the distance from the current position to the estimated stop position increases. Therefore, the size of the robot inclusion region adjusted to include the estimated stop position by the inclusion region adjusting unit can be expanded as the speed of the robot is increased, and a stop position of the robot based on the robot stop command can be prevented from entering the entry prohibited region.

Another aspect of the present invention provides a robot system including a robot and a controller that controls the robot, the controller including: a region generating unit that generates a robot inclusion region which includes the robot and an attached member attached to the robot, and an entry prohibited region near the robot; a future position and speed estimating unit that estimates an estimated future speed and an estimated future position based on a current position and speed of the robot when a predetermined time as elapsed; an entry detecting unit that detects whether or not the robot inclusion region generated by the region generating unit enters the entry prohibited region; a power cutoff unit that immediately stops the robot if the entry detecting unit detects that the robot inclusion region at the current position of the robot enters the entry prohibited region; and a speed limiting unit that reduces an operating speed of the robot if the entry detecting unit detects that the robot inclusion region at the estimated future position of the robot enters the entry prohibited region, wherein the region generating unit includes: a stop position estimating unit that estimates an estimated stop position in a case where a robot stop command is input, based on a position and a speed of the robot; and an inclusion region adjusting unit that adjusts a size of the robot inclusion region so that the robot inclusion region includes the estimated stop position estimated by the stop position estimating unit.

According to this aspect, the region generating unit included in the controller generates the robot inclusion region which includes the robot and its attached member, and the entry prohibited region near the robot. Then, during operation of the robot by the controller, whether or not the robot inclusion region enters the entry prohibited region is monitored by the entry detecting unit.

If the entry detecting unit detects that the robot inclusion region at the current position enters the entry prohibited region, the robot is immediately stopped by operation of the power cutoff unit. As the speed of the robot increases, the distance from the current position to the estimated stop position of the robot increases. Therefore, the size of the robot inclusion region adjusted to include the estimated stop position of the robot by the inclusion region adjusting unit can be expanded as the speed of the robot is increased, and a stop position of the robot based on the robot stop command can be prevented from entering the entry prohibited region.

Further, if the entry detecting unit detects, on a basis of the estimated future speed and the estimated future position of the robot estimated by the future position and speed estimating unit, that the robot inclusion region including the estimated stop position at the estimated future position of the robot estimated by the stop position estimating unit enters the entry prohibited region, the operating speed of the robot is lowered by the speed limiting unit. Thereby, the robot inclusion region is reduced, so that the probability of entry into the entry prohibited region can be reduced. Accordingly, the frequency of stopping the robot is reduced so that the robot can be efficiently operated while securing a wide operating range of the robot without complicating a program.

In the above described aspect, the controller may be configured to operate the robot according to an operation program, and the future position and speed estimating unit may calculate the estimated future speed and the estimated future position using the operation program.

Accordingly, the estimated speed and the estimated position of the robot can be accurately estimated using the operation program.

Further, in the above described aspect, the speed limiting unit may reduce the operating speed of the robot at a predetermined rate.

Accordingly, the operating speed is reduced in a simple manner, and therefore, the frequency of stopping the robot is reduced so that the robot can be efficiently operated while securing a wide operating range of the robot without complicating a program.

Further, in the above described aspect, the speed limiting unit may reduce the operating speed of the robot to a speed less than or equal to an upper limit speed at which the robot inclusion region at the estimated future position does not enter the entry prohibited region, when the entry detecting unit detects that the robot inclusion region including the estimated stop position estimated by the stop position estimating unit enters the entry prohibited region on the basis of the estimated future position.

Accordingly, the operating speed of the robot after reduced by the speed limiting unit is made closer to the upper limit speed, so that the operating speed of the robot is not reduced more than necessary, and therefore the frequency of stopping the robot is reduced so that the robot can be efficiently operated while securing a wide operating range of the robot without complicating a program.

Another aspect of the present invention provides a robot control method including: a region generating step of generating a robot inclusion region which includes a robot and an attached member attached to the robot and whose area increases as a speed of the robot increases, an entry prohibited region near the robot, and a speed limit region along a robot side region of the entry prohibited region; an entry detecting step of detecting whether or not the robot inclusion region generated by the region generating step enters the entry prohibited region or the speed limit region; a speed limiting step of reducing operating speed of the robot if the entry detecting step detects that the robot inclusion region enters the speed limit region; and a power cutoff step of immediately stopping the robot if the entry detecting step detects that the robot inclusion region enters the entry prohibited region.

Another aspect of the present invention provides a robot control method including: a region generating step of generating a robot inclusion region which includes the robot and an attached member attached to the robot, and an entry prohibited region near the robot; a future position and speed estimating step of estimating an estimated future speed and an estimated future position when a predetermined time has elapsed on a basis of a current position and speed of the robot; an entry detecting step of detecting whether or not the robot inclusion region generated by the region generating step enters the entry prohibited region; a power cutoff step of immediately stopping the robot if the entry detecting step detects that the robot inclusion region at the current position of the robot enters the entry prohibited region; and a speed limiting step of reducing an operating speed of the robot if the entry detecting step detects that the robot inclusion region at the estimated future position of the robot enters the entry prohibited region, wherein the region generating step includes: a stop position estimating step of estimating an estimated stop position in a case where a robot stop command is input, on a basis of a position and a speed of the robot; and an inclusion region adjusting step of adjusting a size of the robot inclusion region so that the robot inclusion region includes the estimated stop position estimated by the stop position estimating step.

According to the aforementioned aspects, there is an effect that a robot can be efficiently operated while securing a large working range of the robot without complicating the program.

REFERENCE SIGNS LIST 1, 16 Robot system
2 Robot
3 Controller
7 Region generating unit (Region generating unit, Inclusion region adjusting unit)
9 Stop position estimating unit (Region generating unit)
10 Entry detecting unit
13 Power cutoff unit
14 Speed limiting unit
17 Future position and speed estimating unit
S1 Region setting step (Region generating step)
S2 Region generating step (Region generating step)
S4 Stop position estimating step (Region generating step)
S5 Inclusion region adjusting step (Region generating step)
S6 First entry detecting step (Entry detecting step)
S7 Power cutoff step
S8 Second entry detecting step (Entry detecting step)
S9 Speed limiting step
S11 Future position and speed estimating step
S12 Third entry detecting step (Entry detecting step)
S13 Fourth entry detecting step (Entry detecting step)
X, X1, X2 Robot inclusion region
Y Entry prohibited region
Z Speed limit region

The invention claimed is:

1. A robot system comprising a robot and a controller that controls the robot, wherein the controller is configured to conduct:
   a region generating process that generates a robot inclusion region which includes the robot and an attached member attached to the robot and which comprises a three-dimensional model of the robot that moves together with the robot, the robot inclusion region is increased as speed of the robot increases, and the region generating unit further generates an entry prohibited region near the robot, and a speed limit region along a robot side edge of the entry prohibited region;
   an entry detecting process that detects whether or not the robot inclusion region generated by the region generating process enters the entry prohibited region or the speed limit region;
   a speed limiting process that reduces operating speed of the robot if the entry detecting process detects that the robot inclusion region enters the speed limit region; and
   a power cutoff process that immediately stops the robot if the entry detecting process detects that the robot inclusion region enters the entry prohibited region.

2. The robot system according to claim 1, wherein in the region generating process, the controller is configured to conduct:
   a stop position estimating process that estimates an estimated stop position based on a position and a speed of the robot in a case where a robot stop command is input; and
   an inclusion region adjusting process that adjusts a size of the robot inclusion region so that the robot inclusion region includes the estimated stop position estimated by the stop position estimating process.

3. A robot system comprising a robot and a controller that controls the robot, wherein the controller is configured to conduct:
- a future position and speed estimating unit which estimates an estimated future speed and an estimated future position of the robot after a predetermined time has elapsed based on a current position and a current speed of the robot;
- a region generating process that generates a robot inclusion region which includes the robot and an attached member attached to the robot and which comprises a three-dimensional model of the robot that moves together with the robot, the region generating unit configured to generate the robot inclusion region at the current position and the estimated future position, and the region generating unit further generates an entry prohibited region near the robot;
- an entry detecting process that detects whether or not the robot inclusion region at the current position and the robot inclusion region at the estimated future position generated by the region generating process enters the entry prohibited region;
- a power cutoff process that immediately stops the robot if the entry detecting process detects that the robot inclusion region at the current position of the robot enters the entry prohibited region; and
- a speed limiting process that reduces operating speed of the robot if the entry detecting process detects that the robot inclusion region at the estimated future position of the robot enters the entry prohibited region,
wherein in the region generating process, the controller is configured to conduct:
- a stop position estimating process that estimates an estimated stop position at a current time when a robot stop command is input and an estimated stop position after the predetermined time has passed based on a position and a speed of the robot or the estimated future position and the estimated future speed; and
- an inclusion region adjusting process that adjusts a size of the robot inclusion region so that the robot inclusion region includes the estimated stop position when located at the current position and the estimated stop position when located at the estimated future position which are estimated by the stop position estimating process.

4. The robot system according to claim 3, wherein
the controller is configured to operate the robot according to an operation program, and
in the future position and speed estimating process, the controller calculates the estimated future speed and the estimated future position using the operation program.

5. The robot system according to claim 1, wherein in the speed limiting process, the controller reduces the operating speed of the robot at a predetermined rate.

6. The robot system according to claim 3, wherein in the speed limiting process, the controller reduces the operating speed of the robot to a speed less than or equal to an upper limit speed at which the robot inclusion region at the estimated future position does not enter the entry prohibited region, when the entry detecting process detects that the robot inclusion region including the estimated stop position estimated by the stop position estimating process enters the entry prohibited region on the basis of the estimated future position.

7. A robot control method comprising:
- a region generating step of generating a robot inclusion region which includes a robot and an attached member attached to the robot and which comprises a three-dimensional model of the robot that moves together with the robot, the robot inclusion region is increased as speed of the robot increases, and the region generating unit further generates an entry prohibited region near the robot, and a speed limit region along a robot side region of the entry prohibited region;
- an entry detecting step of detecting whether or not the robot inclusion region generated by the region generating step enters the entry prohibited region or the speed limit region;
- a speed limiting step of reducing operating speed of the robot if the entry detecting step detects that the robot inclusion region enters the speed limit region; and
- a power cutoff step of immediately stopping the robot if the entry detecting step detects that the robot inclusion region enters the entry prohibited region.

8. A robot control method comprising:
- a future position and speed estimating step of estimating an estimated future speed and an estimated future position of the robot after a predetermined time has elapsed based on a current position and a current speed of the robot;
- a region generating step of generating a robot inclusion region which includes the robot and an attached member attached to the robot and which comprises a three-dimensional model of the robot that moves together with the robot, the region generating unit configured to generate the robot inclusion region at the current position and the estimated future position, and the region generating unit further generates an entry prohibited region near the robot;
- an entry detecting step of detecting whether or not the robot inclusion region at the current position and the robot inclusion region at the estimated future position generated by the region generating step enters the entry prohibited region;
- a power cutoff step of immediately stopping the robot if the entry detecting step detects that the robot inclusion region at the current position of the robot enters the entry prohibited region; and
- a speed limiting step of reducing operating speed of the robot if the entry detecting step detects that the robot inclusion region at the estimated future position of the robot enters the entry prohibited region,
wherein the region generating step comprises:
- a stop position estimating step of estimating an estimated stop position at a current time when a robot stop command is input and an estimated stop position after the predetermined time has passed on a basis of a position and a speed of the robot or the estimated future position and the estimated future speed; and
- an inclusion region adjusting step of adjusting a size of the robot inclusion region so that the robot inclusion region includes the estimated stop position when located at the current position and the estimated stop position when located at the estimated future position which are estimated by the stop position estimating step.

* * * * *